US011134549B2

(12) United States Patent
Chen et al.

(10) Patent No.: US 11,134,549 B2
(45) Date of Patent: Sep. 28, 2021

(54) LIGHTING APPARATUS

(71) Applicant: XIAMEN LEEDARSON LIGHTING CO., LTD, Fujian (CN)

(72) Inventors: Yibin Chen, Fujian (CN); Wei Liu, Fujian (CN); Qiqiang Lin, Fujian (CN)

(73) Assignee: XIAMEN LEEDARSON LIGHTING CO., LTD, Xiamen (CN)

( * ) Notice: Subject to any disclaimer, the term of this patent is extended or adjusted under 35 U.S.C. 154(b) by 0 days.

(21) Appl. No.: 17/096,312

(22) Filed: Nov. 12, 2020

(65) Prior Publication Data

US 2021/0144827 A1    May 13, 2021

(30) Foreign Application Priority Data

Nov. 12, 2019  (CN) .......................... 201911101552.0

(51) Int. Cl.
  *H05B 45/32*   (2020.01)
  *H05B 45/325*  (2020.01)
  *H05B 47/11*   (2020.01)

(52) U.S. Cl.
  CPC .......... *H05B 45/325* (2020.01); *H05B 47/11* (2020.01)

(58) Field of Classification Search
  CPC ...... H05B 45/00; H05B 45/32; H05B 45/325; H05B 47/10; H05B 47/11
  See application file for complete search history.

(56) References Cited

U.S. PATENT DOCUMENTS

2012/0200230 A1* 8/2012 Esaki .................... H05B 45/12
                                                        315/200 R
2016/0374177 A1* 12/2016 Chen .................... F04D 27/004

\* cited by examiner

*Primary Examiner* — Jimmy T Vu
(74) *Attorney, Agent, or Firm* — Chun-Ming Shih; Lanway IPR Services

(57) ABSTRACT

A lighting apparatus includes a light source, a power converter, an optical coupler, a light sensor, a frequency detector and a controller. The light source includes a LED module. The light switch is connected to the LED module in series. The light switch selectively turns on and turning off the LED module according to a second PWM signal. The power converter converts an alternating current power source with a working frequency to a direct current power. The optical coupler controls the power converter to work in a constant current mode or a constant voltage mode according to a first PWM signal.

20 Claims, 7 Drawing Sheets

LIGHTING APPARATUS

FIELD

The present invention is related to a lighting apparatus, and more particularly related to a lighting apparatus with automatic control.

BACKGROUND

The time when the darkness is being lighten up by the light, human have noticed the need of lighting up this planet. Light has become one of the necessities we live with through the day and the night. During the darkness after sunset, there is no natural light, and human have been finding ways to light up the darkness with artificial light. From a torch, candles to the light we have nowadays, the use of light have been changed through decades and the development of lighting continues on.

Early human found the control of fire which is a turning point of the human history. Fire provides light to bright up the darkness that have allowed human activities to continue into the darker and colder hour of the hour after sunset. Fire gives human beings the first form of light and heat to cook food, make tools, have heat to live through cold winter and lighting to see in the dark.

Lighting is now not to be limited just for providing the light we need, but it is also for setting up the mood and atmosphere being created for an area. Proper lighting for an area needs a good combination of daylight conditions and artificial lights. There are many ways to improve lighting in a better cost and energy saving. LED lighting, a solid-state lamp that uses light-emitting diodes as the source of light, is a solution when it comes to energy-efficient lighting. LED lighting provides lower cost, energy saving and longer life span.

The major use of the light emitting diodes is for illumination. The light emitting diodes is recently used in light bulb, light strip or light tube for a longer lifetime and a lower energy consumption of the light. The light emitting diodes shows a new type of illumination which brings more convenience to our lives. Nowadays, light emitting diode light may be often seen in the market with various forms and affordable prices.

After the invention of LEDs, the neon indicator and incandescent lamps are gradually replaced. However, the cost of initial commercial LEDs was extremely high, making them rare to be applied for practical use. Also, LEDs only illuminated red light at early stage. The brightness of the light only could be used as indicator for it was too dark to illuminate an area. Unlike modern LEDs which are bound in transparent plastic cases, LEDs in early stage were packed in metal cases.

In 1878, Thomas Edison tried to make a usable light bulb after experimenting different materials. In November 1879, Edison filed a patent for an electric lamp with a carbon filament and keep testing to find the perfect filament for his light bulb. The highest melting point of any chemical element, tungsten, was known by Edison to be an excellent material for light bulb filaments, but the machinery needed to produce super-fine tungsten wire was not available in the late 19th century. Tungsten is still the primary material used in incandescent bulb filaments today.

Early candles were made in China in about 200 BC from whale fat and rice paper wick. They were made from other materials through time, like tallow, spermaceti, colza oil and beeswax until the discovery of paraffin wax which made production of candles cheap and affordable to everyone. Wick was also improved over time that made from paper, cotton, hemp and flax with different times and ways of burning. Although not a major light source now, candles are still here as decorative items and a light source in emergency situations. They are used for celebrations such as birthdays, religious rituals, for making atmosphere and as a decor.

Illumination has been improved throughout the times. Even now, the lighting device we used today are still being improved. From the illumination of the sun to the time when human can control fire for providing illumination which changed human history, we have been improving the lighting source for a better efficiency and sense. From the invention of candle, gas lamp, electric carbon arc lamp, kerosene lamp, light bulb, fluorescent lamp to LED lamp, the improvement of illumination shows the necessity of light in human lives.

There are various types of lighting apparatuses. When cost and light efficiency of LED have shown great effect compared with traditional lighting devices, people look for even better light output. It is important to recognize factors that can bring more satisfaction and light quality and flexibility.

Sometimes, people need light devices capable of providing automatic control.

For example, people may want light devices to turn on when it is dark around and to turn off when ambient light is sufficient.

However, it is difficult on such design for various factors. For example, for light devices with OVP (over voltage protection), there is burst current that under high voltage when the light is started. In addition, it is difficult to detect correct condition to turn on and to turn off the light when there is other influencing factors.

Therefore, it is beneficial to provide a convenient and flexible design to perform automatic control on light device design.

SUMMARY

In some embodiments, a lighting apparatus includes a light source, a power converter, an optical coupler, a light sensor, a frequency detector and a controller.

The light source includes a LED module.

The light switch is connected to the LED module in series.

The light switch selectively turns on and turning off the LED module according to a second PWM signal.

The power converter converts an alternating current power source with a working frequency to a direct current power.

The optical coupler controls the power converter to work in a constant current mode or a constant voltage mode according to a first PWM signal.

The light sensor detects an ambient light to generate an ambient light signal.

The frequency detector detects the working frequency to generate a frequency signal.

The controller receives the ambient light signal collected when the LED module is not turned on and for receiving the frequency signal to generate the first PWM signal and the second PWM signal.

The first PWM signal is supplied to the optical coupler for syncing the direct current power with the working frequency of the alternating current power source.

In some embodiments, the optical coupler is a chopper circuit for controlling a driving frequency of the direct current power according to the first PWM signal.

In some embodiments, when the LED module is turned off, the power converter is controlled by the optical coupler to stay in the constant voltage mode to keep a constant voltage supplying instead of an over voltage protection that causes a burst current when the LED module is turned on.

The power converter is controlled by the optical coupler to stay in the constant current mode to generate a constant current supplied to the LED module when the LED module is turned on.

In some embodiments, the power converter is started up and the controller waits for a first time period for the frequency signal to be stable.

In some embodiments, the second PWM signal is kept at low level depending on the frequency signal for a second time period after the first time period.

In some embodiments, the LED module is turned on constantly for a third time period after the second time period even the ambient light is sufficient enough so that there is no need to turn on the LED module.

In some embodiments, the controller collects the ambient light signal when the LED module is turned on for a fourth time period after the third time period.

The controller turns off the LED module if the ambient light signal indicates that the ambient light is sufficient enough so that there is no need to turn on the LED module.

In some embodiments, the first PWM signal is kept at low level and the second PWM signal is kept at high level after the power converter is started for detecting the frequency signal.

In some embodiments, the controller adjusts the second PWM signal when the LED module is turned on for a time period.

In some embodiments, the controller uses the ambient light signal after a time period of turning off the second PWM signal.

In some embodiments, when the power converter is in an open loop, the second PWM signal is turned on for a fifth time period shorter than a sixth time period reading to an over voltage protection voltage.

In some embodiments, the ambient light signal is detected for multiple times to ensure a need to turn off the LED module.

In some embodiments, when the controller detects an ambient temperature higher than a threshold, a duty ratio of the first PWM signal is lower down.

In some embodiments, the lighting apparatus may also include a capacitor connected to the LED module for providing power to the controller and the light sensor when the LED module is turned off.

In some embodiments, when the controller detects a series switch pattern for turning on and turning off the lighting apparatus, the LED module is turned on ignoring the ambient light signal.

In some embodiments, the LED module includes multiple LED packages mounted on a circuit board, the light sensor is disposed at a center of the circuit board and the multiple LED packages surround the light sensor.

In some embodiments, the lighting apparatus may also include a temperature sensor for detecting an ambient temperature proximal to the LED module.

The ambient temperature is provided to the controller to determine a corresponding control setting.

In some embodiments, when the controller detects there is an abnormal ambient light change pattern, the controller keeps turning on the LED module ignoring the ambient light signal.

In some embodiments, the controller sends a broadcast signal to detect nearby controllable lighting devices.

In some embodiments, the controller turns off the nearby controllable lighting devices while collecting the ambient light signal.

DETAILED DESCRIPTION

Figure 3:
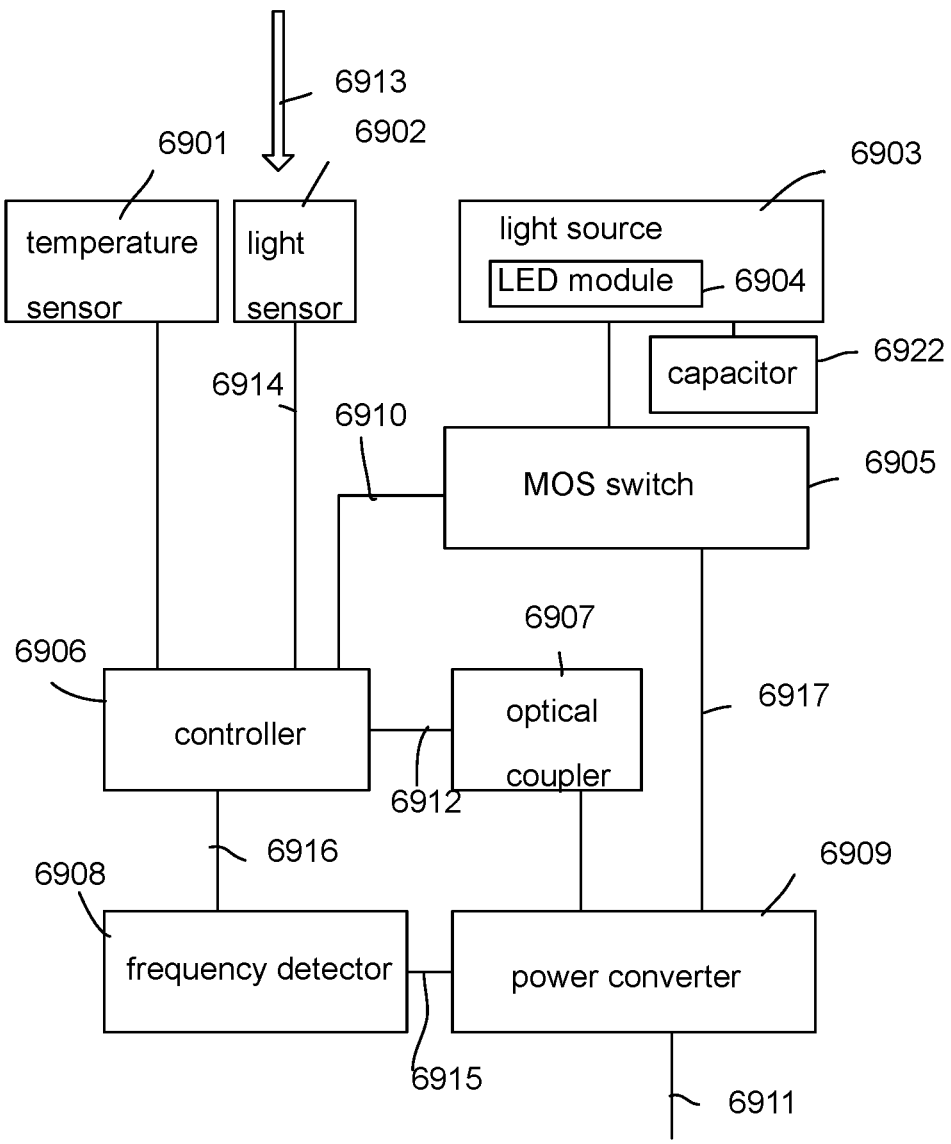
FIG. 3 illustrates another embodiment of a lighting apparatus.

Please refer to FIG. 3, a lighting apparatus includes a light source 6903, a power converter 6909, an optical coupler 6907, a light sensor 6902, a frequency detector 6908 and a controller 6906.

The light source 6903 includes a LED module 6904. LED refers to Light Emitted Diode, which is a popular technology using semiconductor devices to convert electricity to light. In some embodiments, the LED module may include multiple LED packages, each may include one or multiple LED chips. For example, each LED package may include a white LED chip and a color LED chip, e.g. red LED chip, blue LED chip or green LED chip. By combining multiple LED chips of different types in the same package, it is easy to render mixed lights more naturally.

The light switch 6905 is connected to the LED module 6903 in series. The light switch 6905 may be a MOS (Metal-Oxide semiconductor) transistor that has a gate for turning on or turning off current to pass through, thus turning on or turning off the LED module 6903 connected in series with the light switch 6905.

The light switch 6905 selectively turns on and turns off the LED module 6903 according to a second PWM signal 6910. PWM refers to Pulse Width Modulation, which is a method of reducing the average power delivered by an electrical signal, by effectively chopping it up into discrete parts. The average value of voltage (and current) fed to the load is controlled by turning the switch between supply and load on and off at a fast rate. The longer the switch is on compared to the off periods, the higher the total power supplied to the load. Along with maximum power point tracking (MPPT), it is one of the primary methods of reducing the output of solar panels to that which can be utilized by a battery. PWM is particularly suited for running inertial loads such as motors, which are not as easily affected by this discrete switching, because their inertia causes them to react slowly. The PWM switching frequency has to be high enough not to affect the load, which is to say that the resultant waveform perceived by the load must be as smooth as possible.

The rate (or frequency) at which the power supply must switch can vary greatly depending on load and application. For example, switching has to be done several times a minute in an electric stove; 120 Hz in a lamp dimmer; between a few kilohertz (kHz) and tens of kHz for a motor drive; and well into the tens or hundreds of kHz in audio amplifiers and computer power supplies. The main advantage of PWM is that power loss in the switching devices is very low. When a switch is off there is practically no current, and when it is on and power is being transferred to the load, there is almost no voltage drop across the switch. Power loss, being the product of voltage and current, is thus in both cases close to zero. PWM also works well with digital controls, which, because of their on/off nature, can easily set the needed duty cycle. PWM has also been used in certain communication systems where its duty cycle has been used to convey information over a communications channel.

In electronics, many modern microcontrollers (MCUs) integrate PWM controllers exposed to external pins as peripheral devices under firmware control by means of internal programming interfaces. These are commonly used for direct current (DC) motor control in robotics and other applications.

The power converter 6909 converts an alternating current power source 6911 with a working frequency to a direct current power.

The optical coupler 6907 controls the power converter 6909 to work in a constant current mode or a constant voltage mode according to a first PWM signal 6912.

The light sensor 6902 detects an ambient light 6913 to generate an ambient light signal 6914.

The frequency detector 6908 detects the working frequency 6915 to generate a frequency signal 6916. For example, the alternating power source is an alternating current 110V/220V with 50 Hz or 60 Hz frequency, which is the working frequency mentioned here.

The controller 6906 receives the ambient light signal 6914 collected when the LED module 6903 is not turned on and for receiving the frequency signal 6916 to generate the first PWM signal 6912 and the second PWM signal 6910.

The first PWM signal 6912 is supplied to the optical coupler 6907 for syncing the direct current power 6917 with the working frequency of the alternating current power source 6911.

In some embodiments, the optical coupler is a chopper circuit for controlling a driving frequency of the direct current power according to the first PWM signal.

In electronics, a chopper circuit is used to refer to numerous types of electronic switching devices and circuits used in power control and signal applications. A chopper is a device that converts fixed DC input to a variable DC output voltage directly. Essentially, a chopper is an electronic switch that is used to interrupt one signal under the control of another.

In power electronics applications, since the switching element is either fully on or fully off, its losses are low and the circuit can provide high efficiency. However, the current supplied to the load is discontinuous and may require smoothing or a high switching frequency to avoid undesirable effects. In signal processing circuits, use of a chopper stabilizes a system against drift of electronic components; the original signal can be recovered after amplification or other processing by a synchronous demodulator that essentially un-does the "chopping" process.

PWM is useful in light device driver design for quickly switching on and off alternatingly to change a total current amount supplied to LED devices within a time period, which causes different luminance level, or say light intensity of the LED devices.

PWM is an example for chopper circuit and other chopper circuits may be used in this invention to replace PWM devices and related PWM signals to perform the same task.

An optical coupler is an electronic component that transfers electrical signals between two isolated circuits by using light. The optical coupler prevents high voltages from affecting the system receiving the signal. Commercially available optical coupler withstands input-to-output voltages up to 10 kV and voltage transients with speeds up to 25 kV/µs.

A common type of optical coupler consists of an LED and a phototransistor in the same opaque package. Other types of source-sensor combinations include LED-photodiode, LED-LASCR, and lamp-photoresistor pairs. Usually optical couplers transfer digital (on-off) signals, but some techniques allow them to be used with analog signals.

In some embodiments, when the LED module is turned off, the power converter is controlled by the optical coupler to stay in the constant voltage mode to keep a constant voltage supplying instead of an over voltage protection that causes a burst current when the LED module is turned on.

The constant voltage mode refers to keep a constant voltage supply on nodes of a circuit. The constant current mode refers to supply a constant current, which may be implemented with various known constant current source designs.

To keep the circuit in the constant voltage mode helps prevent burst current to occur when a sudden start is triggered. Particularly it is important when over voltage protection (OVP) is adopted. Various OVP circuits causes such burst currents when the circuit is started, which decreases life span of LED and other components.

The power converter 6909 is controlled by the optical coupler 6907 to stay in the constant current mode to generate a constant current supplied to the LED module when the LED module is turned on. For example, the optical coupler 6907 selectively turns on or turns off the power converter 6909 according to the first PWM signal mentioned above.

Figure 4:
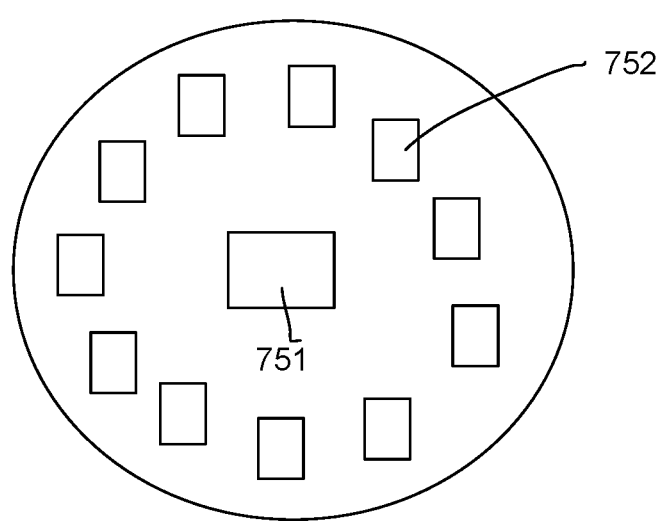
FIG. 4 shows a light sensor arrangement with respect to LED packages.

FIG. 4 shows that a light sensor 751 is surrounded by multiple LED packages 752. Such arrangement is helpful to get a nice detection result.

Figure 5:
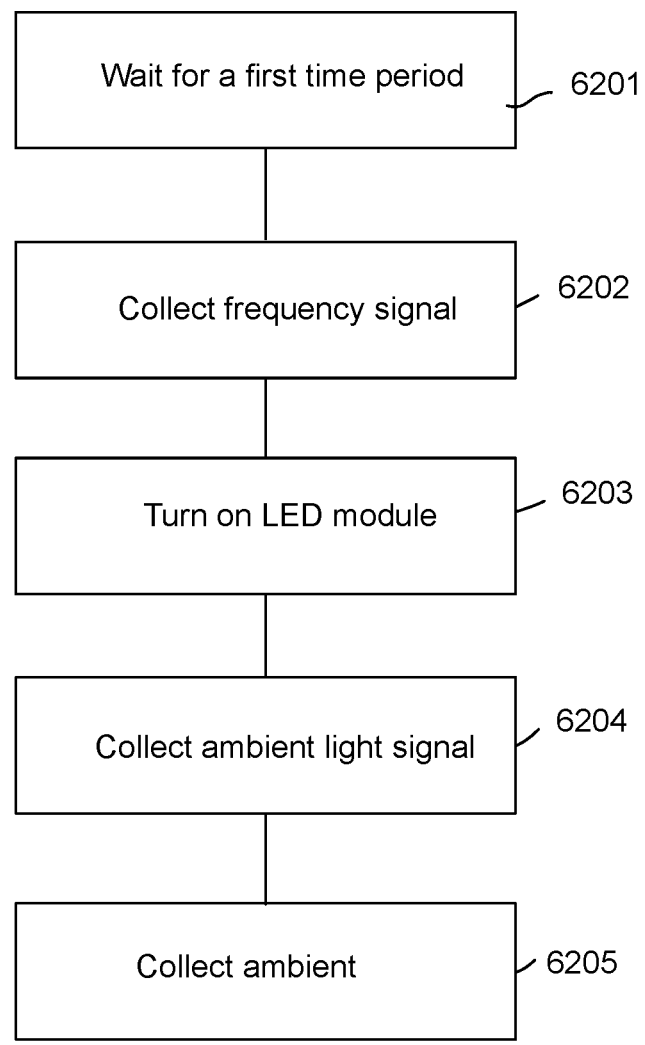
FIG. 5 shows a flowchart of the controlling method.

Please refer to FIG. 5, which is a flowchart showing a control procedure in an embodiment, e.g. the one explained in FIG. 3.

In step 6201, the power converter is started up and the controller waits for a first time period for the frequency signal to be stable.

In step 6202, the second PWM signal is kept at low level depending on the frequency signal for a second time period after the first time period. The low level and high level of a PWM signal mentioned here respectively refer to a low voltage level and a high voltage level in a continuous square or semi-square wave of the PWM signal.

In this step, after the first time period, e.g. 100 ms, the voltage is getting more stable, which is better for collecting and analyzing the working frequency of the input power source. It is important and useful to find the frequency and try syncing or following the working frequency to increase power factor (PF), which refers to the power efficiency while converting electricity to light. When the converted direct current is chopped with a synchronized pattern as the working frequency, higher PF is obtained.

Figure 6:
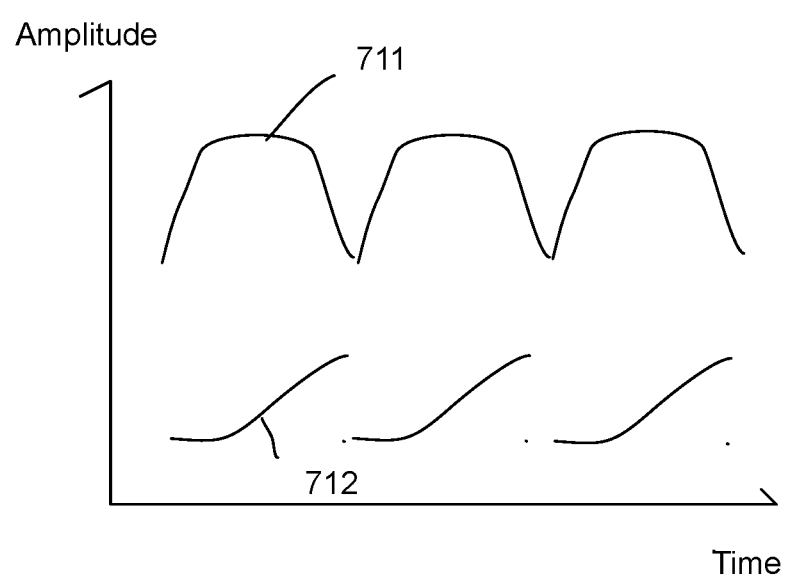
FIG. 6 shows a relation between electricity signals.

Please refer to FIG. 6, FIG. 6 shows an alternating power source 711 passing a bridge circuit that still has an apparent periodical change, corresponding to a working frequency. By syncing the PWM wave to align with the working frequency, the overall PF is increased significantly.

In step 6203, the LED module is turned on constantly for a third time period after the second time period even the ambient light is sufficient enough so that there is no need to turn on the LED module.

In step 6204, the controller collects the ambient light signal when the LED module is turned on for a fourth time period after the third time period.

The controller turns off the LED module if the ambient light signal indicates that the ambient light is sufficient enough so that there is no need to turn on the LED module.

In step 6205, the first PWM signal is kept at low level and the second PWM signal is kept at high level after the power converter is started for detecting the frequency signal.

The LED module is turned off when the ambient signal is collected.

For a LED module regularly turned on and turned off, there is a regular timing that the LED module is turned off. In such timing the controller collects the light sensor to obtain an ambient light signal corresponding to the ambient light intensity level, e.g. a dark environment.

In some embodiments, the controller adjusts the second PWM signal when the LED module is turned on for a time period.

Specifically, when the LED module is turned on continuously for a time period, the LED module is getting hotter and hotter and thus even the LED module is turned off, there is still infrared light affecting the ambient light collection.

Therefore, the controller may include a table with corresponding adjusting parameters for time period turning on the LED module and the response timing and triggering timing on using the light sensor, particularly when the light sensor is an infrared light sensor.

In some embodiments, the controller uses the ambient light signal after a time period of turning off the second PWM signal.

In some embodiments, when the power converter is in an open loop, the second PWM signal is turned on for a fifth time period shorter than a sixth time period reading to an over voltage protection voltage.

In some embodiments, the ambient light signal is detected for multiple times to ensure a need to turn off the LED module.

In FIG. 3, when the controller 6906 detects an ambient temperature higher than a threshold, a duty ratio of the first PWM signal is lower down.

Specifically, a temperature sensor 6901 is used for collecting an ambient temperature information, e.g. too hot or cool enough under a threshold. The ambient temperature information is used for dynamically adjusting the current of the LED module, e.g. by decreasing a duty ratio of the first PWM signal. The duty ratio is a term used for PWM signals. A duty cycle or power cycle is the fraction of one period in which a signal or system is active. Duty cycle is commonly expressed as a percentage or a ratio. A period is the time it takes for a signal to complete an on-and-off cycle.

In FIG. 3, the lighting apparatus may also include a capacitor 6922 connected to the LED module 6904 for providing power to the controller 6906 and the light sensor 6902 when the LED module 6904 is turned off.

In some embodiments, when the controller detects a series switch pattern for turning on and turning off the lighting apparatus, the LED module is turned on ignoring the ambient light signal.

For example, when two lighting devices both with automatic control sensitive to ambient light intensity, e.g. to turn on in dark environment. The two lighting devices may affect each other. When a regular but abnormal turn-on and turn-off pattern is found, e.g. the two lighting devices turning on alternatively to affect each other, there is unwanted blink problem. The controller may have a memory storing a program codes to be executed by a processor of the controller. The program may include several ambient light signal patterns that may be caused by other lighting devices to make wrong decisions.

When such problem is identified, the controller either continues to turn on or to turn off, or turn on an indicator to tell users such problem.

In some embodiments, the LED module includes multiple LED packages mounted on a circuit board, the light sensor is disposed at a center of the circuit board and the multiple LED packages surround the light sensor.

In some embodiments, the lighting apparatus may also include a temperature sensor for detecting an ambient temperature proximal to the LED module.

The ambient temperature is provided to the controller to determine a corresponding control setting.

In some embodiments, when the controller detects there is an abnormal ambient light change pattern, the controller keeps turning on the LED module ignoring the ambient light signal.

Figure 7:
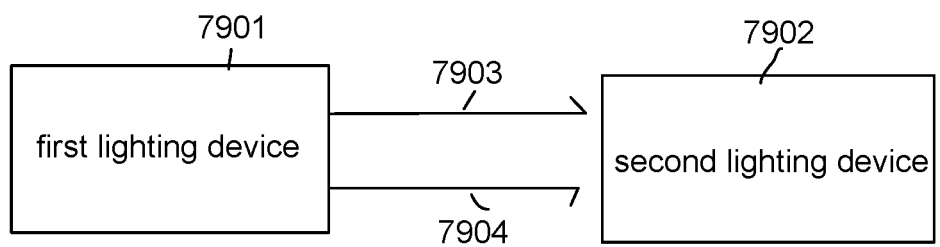
FIG. 7 shows multiple devices working together.

In FIG. 7, the controller of a first lighting device 7901 sends a broadcast signal 7903 to detect nearby controllable lighting devices, e.g. a second lighting device 7902. The second lighting device 7902 may have a wireless circuit for receiving and parsing the broadcast signal 7903. When such cases occur, the two lighting devices may work together, instead of affecting normal use of each other.

In some embodiments, the controller of the first lighting device 7901 turns off the nearby controllable lighting devices, e.g. the second lighting device 7902 while collecting the ambient light signal by sending a control signal 7904.

Figure 1:
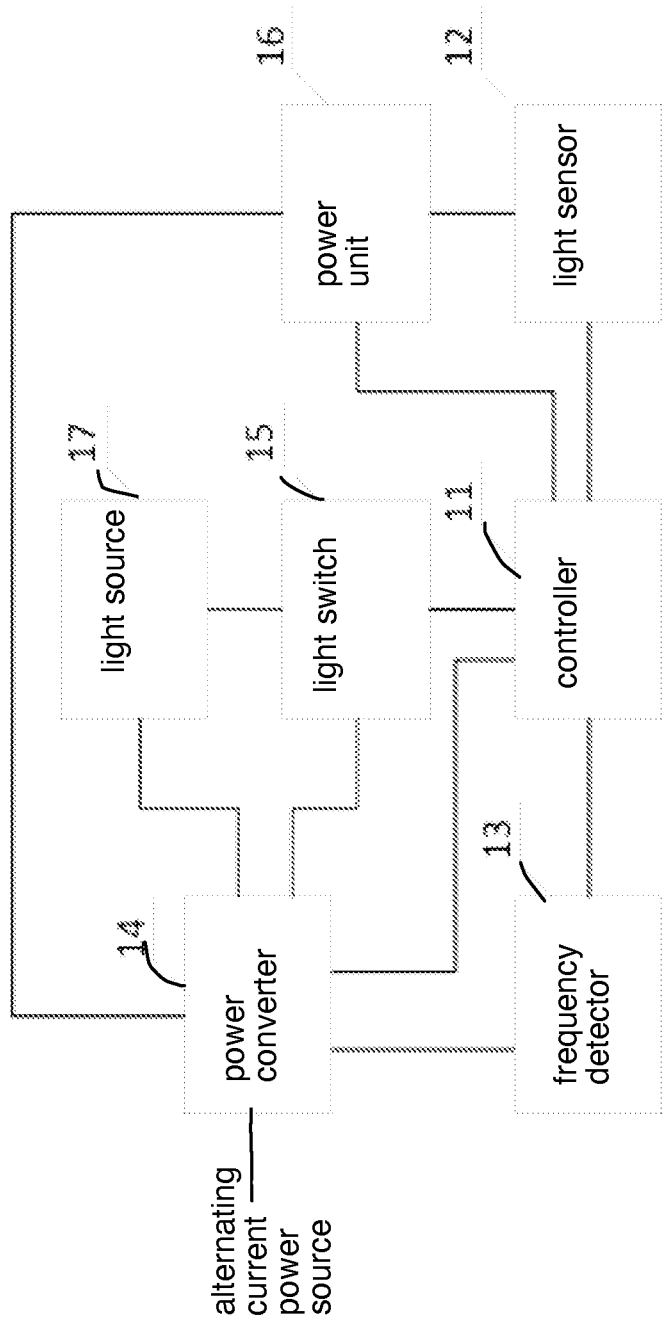
FIG. 1 illustrates a circuit diagram of an embodiment.

Please refer to FIG. 1, which shows another embodiment.

In FIG. 1, the lighting apparatus has a light source 17, which may include one or multiple LED modules. The light source 17 is connected with a light switch 15 in series so that when the light switch 15 is turned off, the light source 17 is turned off consequently.

There is a power unit 16 providing power to the controller 11 and the light sensor 12. The light sensor 12 collects ambient light level and converts the information to a signal to be used by the controller 11 to turn on and to turn off the light switch 15 to control the light source 17. The frequency detector 13 detects the working frequency of the alternating current power source and the controller 11 syncs the driving currents supplied to the light source 17 to increase power factor (PF).

Figure 2:
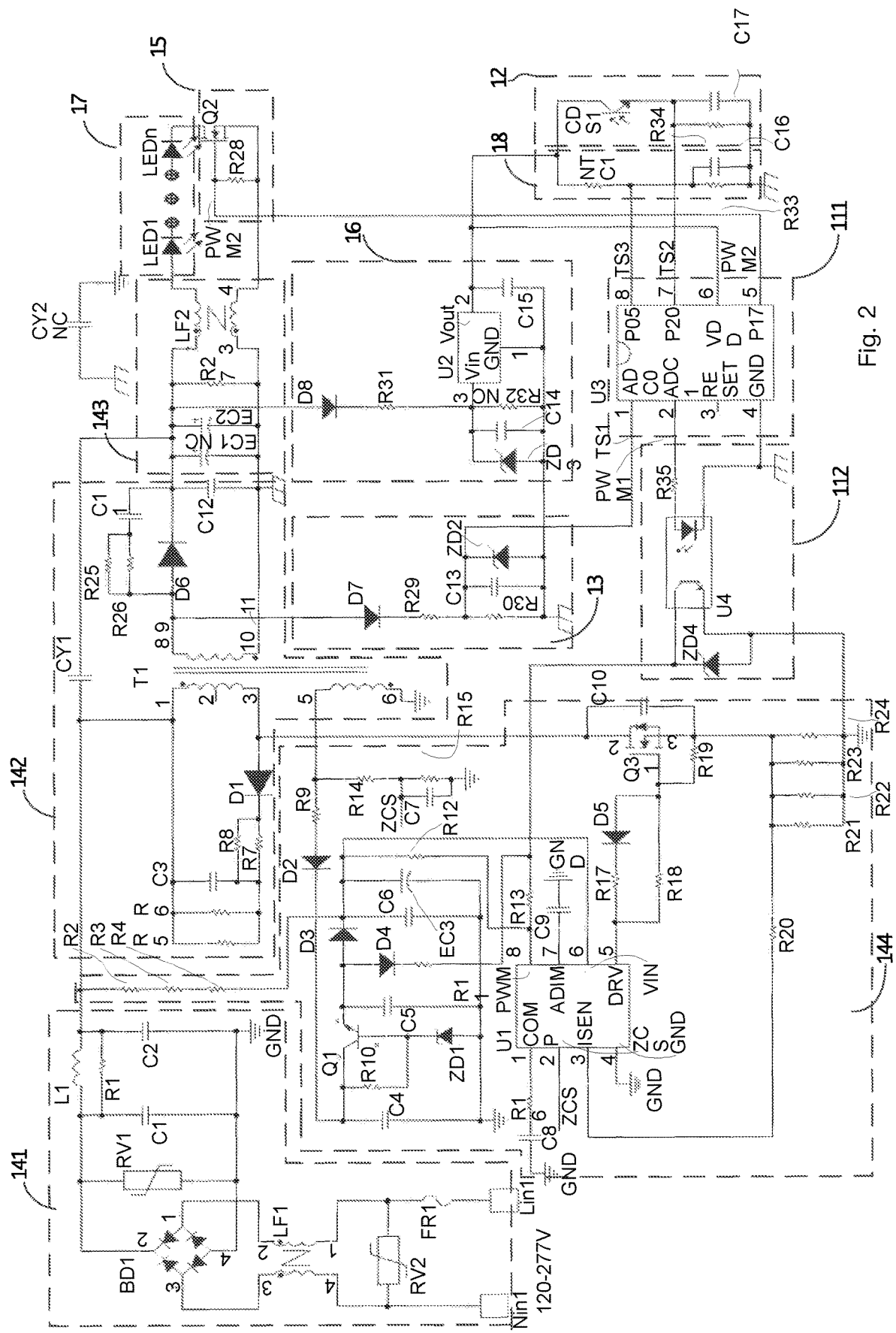
FIG. 2 illustrates a detailed diagram for a driver circuit in a lighting apparatus embodiment.

FIG. 2 shows a detailed circuit of the example in FIG. 1 teaching persons skilled in the art to implement an embodiment based on the inventive concept mentioned above. The same reference numerals refer to the same components.

The controller 11 includes a main control unit 111 and an optical coupler 112.

The light sensor 12, the frequency detector 13, the power unit 16 and the light switch 15 are coupled to the main control unit 111. The optical coupler 112 has an input connecting to the main control unit 111. The output end of the optical coupler 112 is connected to the power converter 14.

The main control unit 111 may include a control chip U3. An interrupt end of the control chip U3 is connected to the frequency detector 13. The first PWM output is connected to the optical coupler 12. The second data I/O end is connected to a temperature sensor 18. The second PWM end is connected to the light switch 15. The power end is connected to the power converter 14.

The control chip U3 may be a micro-processor based on CMOS, e.g. a CS98P373GEO micro-processor, which may execute a stored program codes to generate corresponding control signals.

The optical coupler 112 may include a third resistor R35, an optical coupling unit U4 and a second Zen diode ZD4.

There is an isolation to the ground end and therefore the controller 11 needs to send signal to the power converter 14.

The light sensor 12 may include a light sensor diode CDS1, a second capacitor C17 and a fourth resistor R34.

The frequency detector 13 may include a first diode D7, a first resistor R29, a second resistor R30, a first capacitor C13 and a Zen diode ZD2.

The power converter 14 may include a rectifier filter unit 141, a transformer 142, an output filter unit 143 and a dimmer unit 144.

The rectifier filter unit 141, the transformer unit 142 and the output filter 143 are connected in series.

The rectifier filter unit 141 is connected to an indoor power source, e.g. an alternating current power source.

The output filter 143, the light source 17 and the light switch 15 form a loop.

The output filter 143 is also connected to the frequency detector 13 and the power unit 16.

The dimmer unit 144 is connected to the transformer 142 and the controller 11.

The rectifier filter unit 141 may include a bridge BD1, a common mode inductor LF1, a first inductor L1, a third capacitor C1, a fourth capacitor C2, a voltage sensitive resistor RV1, a second voltage sensitive resistor RV2, a fifth resistor R1 and a fuse FR1.

The transformer unit 142 may include a transformer T1, a sixth resistor R5, a seventh resistor R6, an eighth resistor R7, a ninth resistor R8, a tenth resistor R25, an eleventh resistor R26, a fifth capacitor C3, a sixth capacitor C11, a seventh capacitor C12, an eighth capacitor CY1, a second diode D1 and a third diode D6.

The output filter 143 may include a second common mode inductor LF2, a ninth capacitor EC1, a tenth capacitor EC2 and a twelfth resistor R27.

The dimmer unit 14 may include a PWM driver chip U1, a second transistor Q3, a triode Q1, a fifth diode D2, a sixth diode D3, a seventh diode D4, an eighth diode D5, an eleventh Zen diode ZD1, an eleventh capacitor C4, a twelfth capacitor C5, a thirteenth capacitor C6, a fourteenth capacitor C7, a fifteenth capacitor C8, a sixteenth capacitor C9, a seventeenth capacitor C10, an eighteenth capacitor EC3, a seventeenth resistor R4, an eighteenth resistor R9, a nineteenth resistor R10, a twentieth resistor R1, a twenty-first resistor R12, a twenty-second resistor R13, a twenty-third resistor R14, a twenty-fourth resistor R15, a twenty-fifth resistor R16, a twenty-sixth resistor R17, a twenty-seventh resistor R18, a twenty-eighth resistor R19, a twenty-ninth resistor R20 and a thirtieth resistor R21.

The light switch 15 may include a first resistor Q2 and a thirteenth resistor R28.

The first transistor Q2 has a control end connected to the controller 11. The controller is also connected to the thirteenth resistor R28 and the output filter 143. The first end of the first transistor Q2 is connected to the output end of the light source 17. The second end of the first transistor Q2 is connected to the output filter 143.

The controller 11 outputs a high voltage to the light switch 15, the first transistor Q2 is turned on and the loop is closed to turn on the light source 17.

The power unit 16 may include a constant voltage power source chip U2, a third Zen diode ZD3, a fourth diode D8, an eleventh capacitor C14, a twelfth capacitor C15, a fourteenth resistor R31 and a fifteenth resistor R32.

The temperature sensor 18 is connected to the power unit 16 and the controller 11 for detecting an ambient temperature and forwards the information to the controller 11.

The temperature sensor 18 may include a temperature resistor NTC1, a sixteenth resistor R33 and a thirteenth capacitor C16.

The nineteenth capacitor CY2 has a first end connected to a first ground end. The second end of the nineteenth capacitor CY2 has a second end connected to a second ground end.

The integrated chips U1, U2 and U3 may be found in the market with various parameters and persons of ordinary skilled in the art knows how to implement a driver circuit based on the disclosure above to implement an invention embodiment. It is the principle and known to persons skilled in circuit design. The concept explained with examples is believed sufficient to teach persons skilled in the art to enable various embodiments of this invention.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A lighting apparatus, comprising:
   a light source comprising a LED module;
   a light switch connected to the LED module in series, wherein the light switch selectively turning on and turning off the LED module according to a second PWM signal;
   a power converter for converting an alternating current power source with a working frequency to a direct current power;
   an optical coupler for controlling the power converter to work in a constant current mode or a constant voltage mode according to a first PWM signal;
   a light sensor for detecting an ambient light to generate an ambient light signal;
   a frequency detector for detecting the working frequency to generate a frequency signal; and
   a controller for receiving the ambient light signal collected when the LED module is not turned on and for receiving the frequency signal to generate the first PWM signal and the second PWM signal, wherein the first PWM signal is supplied to the optical coupler for syncing the direct current power with the working frequency of the alternating current power source.

2. The lighting apparatus of claim 1, wherein the optical coupler is a chopper circuit for controlling a driving frequency of the direct current power according to the first PWM signal.

3. The lighting apparatus of claim 1, wherein when the LED module is turned off, the power converter is controlled by the optical coupler to stay in the constant voltage mode to keep a constant voltage supplying instead of an over voltage protection that causes a burst current when the LED module is turned on, and the power converter is controlled by the optical coupler to stay in the constant current mode to generate a constant current supplied to the LED module when the LED module is turned on.

4. The lighting apparatus of claim 1, wherein the power converter is started up and the controller waits for a first time period for the frequency signal to be stable.

5. The lighting apparatus of claim 4, wherein the second PWM signal is kept at low level depending on the frequency signal for a second time period after the first time period.

6. The lighting apparatus of claim 5, wherein the LED module is turned on constantly for a third time period after the second time period even the ambient light is sufficient enough so that there is no need to turn on the LED module.

7. The lighting apparatus of claim 6, wherein the controller collects the ambient light signal when the LED module is turned on for a fourth time period after the third time period, wherein the controller turns off the LED module if the ambient light signal indicates that the ambient light is sufficient enough so that there is no need to turn on the LED module, and wherein the controller turns off the LED module if the ambient light signal indicates that the ambient light is sufficient enough so that there is no need to turn on the LED module.

8. The lighting apparatus of claim 1, wherein the first PWM signal is kept at low level and the second PWM signal is kept at high level after the power converter is started for detecting the frequency signal.

9. The lighting apparatus of claim 1, wherein the controller adjusts the second PWM signal when the LED module is turned on for a time period.

10. The lighting apparatus of claim 1, wherein the controller uses the ambient light signal after a time period of turning off the second PWM signal.

11. The lighting apparatus of claim 1, wherein when the power converter is in an open loop, the second PWM signal is turned on for a fifth time period shorter than a sixth time period reading to an over voltage protection voltage.

12. The lighting apparatus of claim 1, wherein the ambient light signal is detected for multiple times to ensure a need to turn off the LED module.

13. The lighting apparatus of claim 1, wherein when the controller detects an ambient temperature higher than a threshold, a duty ratio of the first PWM signal is lower down.

14. The lighting apparatus of claim 1, further comprising a capacitor connected to the LED module for providing power to the controller and the light sensor when the LED module is turned off.

15. The lighting apparatus of claim 1, wherein when the controller detects a series switch pattern for turning on and turning off the lighting apparatus, the LED module is turned on ignoring the ambient light signal.

16. The lighting apparatus of claim 1, wherein the LED module comprises multiple LED packages mounted on a circuit board, the light sensor is disposed at a center of the circuit board and the multiple LED packages surround the light sensor.

17. The lighting apparatus of claim 1, further comprising a temperature sensor for detecting an ambient temperature proximal to the LED module, wherein the ambient temperature is provided to the controller to determine a corresponding control setting.

18. The lighting apparatus of claim 1, wherein when the controller detects there is an abnormal ambient light change pattern, the controller keeps turning on the LED module ignoring the ambient light signal.

19. The lighting apparatus of claim 1, wherein the controller sends a broadcast signal to detect nearby controllable lighting devices.

20. The lighting apparatus of claim 19, wherein the controller turns off the nearby controllable lighting devices while collecting the ambient light signal.

* * * * *